United States Patent
Jagota et al.

(10) Patent No.: US 11,016,959 B2
(45) Date of Patent: *May 25, 2021

(54) TRIE-BASED NORMALIZATION OF FIELD VALUES FOR MATCHING

(71) Applicant: salesforce.com, inc., San Francisco, CA (US)

(72) Inventors: Arun Kumar Jagota, Sunnyvale, CA (US); Ajitesh Jain, San Mateo, CA (US); Dmytro Kudriavtsev, Belmont, CA (US)

(73) Assignee: salesforce.com, inc., San Francisco, CA (US)

( * ) Notice: Subject to any disclaimer, the term of this patent is extended or adjusted under 35 U.S.C. 154(b) by 518 days.

This patent is subject to a terminal disclaimer.

(21) Appl. No.: 15/884,732

(22) Filed: Jan. 31, 2018

(65) Prior Publication Data

US 2019/0236178 A1 Aug. 1, 2019

(51) Int. Cl.
| | |
|---|---|
| *G06F 16/23* | (2019.01) |
| *G06F 16/2458* | (2019.01) |
| *G06F 16/2457* | (2019.01) |
| *G06F 16/22* | (2019.01) |
| *G06F 16/2452* | (2019.01) |

(52) U.S. Cl.
CPC ...... *G06F 16/2365* (2019.01); *G06F 16/2246* (2019.01); *G06F 16/2468* (2019.01); *G06F 16/24526* (2019.01); *G06F 16/24575* (2019.01)

(58) Field of Classification Search
CPC .............. G06F 16/2246; G06F 16/322; G06F 16/9027; G06F 40/284; G06F 40/289; G06F 40/279; G06F 16/2365; G06F 16/2468; G06F 16/24575; G06F 16/235; G06F 16/9014; G06F 16/215; G06F 16/2458; G06F 16/2465; G06F 16/24526
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| (Continued) | | |

OTHER PUBLICATIONS

U.S. Appl. No. 13/986,251, Apr. 16, 2013.

*Primary Examiner* — David T. Brooks
(74) *Attorney, Agent, or Firm* — Dergosits & Noah LLP; Todd A. Noah

(57) ABSTRACT

A system tokenizes values stored in a field by multiple records. The system creates a trie from the tokenized values, each branch in the trie labeled with one of the tokenized values, each node storing a count indicating the number of the multiple records associated with a tokenized value sequence beginning from a root of the trie. The system tokenizes a value stored in the field by a prospective record. Beginning from the root of the trie, the system identifies each node corresponding to a token value sequence for the prospective record's tokenized value. Beginning from the most recently identified node for the prospective record's token value sequence, the system identifies each extending node which stores a count that satisfies a threshold, each identified extending node corresponding to another token value sequence. The system uses the other token value sequence to identify one of the multiple records that matches the prospective record.

17 Claims, 6 Drawing Sheets

(56) References Cited

U.S. PATENT DOCUMENTS

| | | |
|---|---|---|
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,614,789 B1 * | 9/2003 | Yazdani ............... H04L 45/00 370/392 |
| 6,621,834 B1 | 9/2003 | Scherpbier |
| 6,654,032 B1 | 11/2003 | Zhu |
| 6,662,180 B1 * | 12/2003 | Aref ................ G06F 16/322 |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,043,198 B1 * | 5/2015 | Black ................. G06F 40/274 704/9 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0260694 A1 * | 12/2004 | Chaudhuri .......... G06F 16/2468 |
| 2004/0268299 A1 | 12/2004 | Lei et al. |
| 2005/0027744 A1 * | 2/2005 | Avadhanam ........ G06F 16/2246 |
| 2005/0050555 A1 | 3/2005 | Exley et al. |
| 2005/0091098 A1 | 4/2005 | Brodersen et al. |
| 2006/0004744 A1 * | 1/2006 | Nevidomski ...... G06F 16/90344 |
| 2007/0260595 A1 * | 11/2007 | Beatty ................. G06F 16/903 |
| 2008/0208854 A1 * | 8/2008 | Badr ................. G06F 16/90344 |
| 2008/0275837 A1 * | 11/2008 | Lambov ........... G06F 16/90344 706/48 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0010989 A1 * | 1/2010 | Li ..................... G06F 16/334 707/E17.017 |
| 2010/0023514 A1 * | 1/2010 | Parikh ............... G06F 40/242 707/E17.001 |
| 2010/0174725 A1 * | 7/2010 | Adams ............... G06F 16/242 707/749 |
| 2012/0233137 A1 | 9/2012 | Jakobson et al. |
| 2013/0138427 A1 * | 5/2013 | de Zeeuw ............ G06F 40/226 704/9 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0280638 A1 * | 9/2014 | O'Dell ................ H04L 51/12 709/206 |

(56) References Cited

U.S. PATENT DOCUMENTS

| | | |
|---|---|---|
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0134666 A1* | 5/2015 | Gattiker .............. G06F 16/3338 707/739 |
| 2015/0172563 A1 | 6/2015 | Jakobson et al. |
| 2018/0039661 A1* | 2/2018 | Kirshenbaum ... G06F 16/24539 |

* cited by examiner

TRIE-BASED NORMALIZATION OF FIELD VALUES FOR MATCHING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database can store digital objects or records for each person or organization that may be able to help in achieving a goal. Each record can consist of a few standard fields, such as organization name, street address, city, state, zip code, country, website, e-mail address, phone number, number of employees, and annual revenue. A data platform enables data providers, such as data marketplace vendors and crowd-sourced database system users, to provide their datasets to organizations via the platform. After an organization inputs a dataset from the platform, the organization's database system matches the input dataset's records, which may be referred to as suspect records or prospective records, to appropriate type(s) of the organization's existing records, which may be referred to as candidate records. A database system can identify which existing database records sufficiently match the input record. The matching results may be sorted or ranked based on their closeness to input record. The database system can use suitable fields of data from the matching input records to update or add to the organization's matching existing records, thereby enriching the organization's existing records. For example, a database system inputs a record that includes [Company name: Salesforce|City: San Francisco|State: CA, and determine that the database record which is the most closely related to the input record is the database record that includes [COMPANY_NAME: "Salesforce.com, Inc."|AD-DRESS_LINE1: "1 Market Ste 300"|CITY: "San Francisco"|STATE: "California"|ZIP: "94105-5188"|COUNTRY: "United States"|COMPANY_PHONE: +1.415.901.7000"|FORTUNE RANK: "483"|EMPLOYEE COUNT: "19,000"|REVENUE: "6,667,216,000."] Thus, in this example the matching of these records enables the database system to update the information that the database has about Salesforce.

Matching can occur as a result of configured match rules. An example of a match rule is name-city-zip, where different algorithms and thresholds may be used to match different fields. For instance, the name-city-zip rule could be configured as follows:
Name:
  Algorithms:
    Edit Distance
    N Grams Similarity
  Threshold:
    90
City:
  Algorithms:
    Exact Match
  Threshold:
    100
Zip:
  Zip-Base:
    Algorithms:
      Exact Match
    Threshold:
      100
  Zip-Addon:
    Algorithms:
      Edit distance
    Threshold:
      80
  Missing Data:
    Ignore Blanks.

A database administrator can configure multiple such rules by using varying algorithms and thresholds that depend on the leniency of the rule. For example, since the name-city-zip match rule is so broad, its low match thresholds may result in a significant number of false positive matches. However, since a name-address-phone match rule represents a stricter criterion for matching, low thresholds for such a rule make sense. Examples of other match rules include: name-zip, name-address, name-phone, domain-phone, domain-city-state, and domain-address.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

An input record's field values, which a database system uses for matching, may be incomplete. For instance, "Kia Motors" is an incomplete company name that is commonly used for the complete company name "Kia Motors America Inc." A database system that uses an edit distance to compare this incomplete company name to this complete company name can produce a relatively low matching score of 56 (on a scale of 100). Such a score will not result in an identified match for many match rules, such as the name-zip match rule and the name-city-state match rule, for which the thresholds are set relatively high to avoid false positive matches. Other such examples of incomplete and complete company names include: "The Washington Post," which is commonly used for "The Washington Post Company,"

"Sogeti," which is commonly used for "Sogeti USA LLC," and "Merrill Lynch," which is commonly used for "Merrill Lynch Group."

A database system can use a trie-based normalization of field values to solve this field value matching problem. The database system can use tokenized values of a field in the database to build or create a trie data structure that is used for matching field values. A trie can be a tree data structure of prefix sequences found in a field, with every branch labeled by a token value, where all descendants of a node have a common prefix. A root-to-node path yields a sequence of tokens, which is formed by concatenating the labels of all the branches in the path, starting from the root. The database system stores into each node the count of records in the database in which this field's value has that particular prefix sequence. When the database system receives a new field value, the database system references the trie for the field to identify the path that is the field value's unique prefix. If the prefix does not extend to the end of the full sequence, then the database system extends the trie so that the field value's unmatched suffix becomes a path below the current path. Next, the database system increments the counts for all nodes in this path by 1.

Figure 1A:
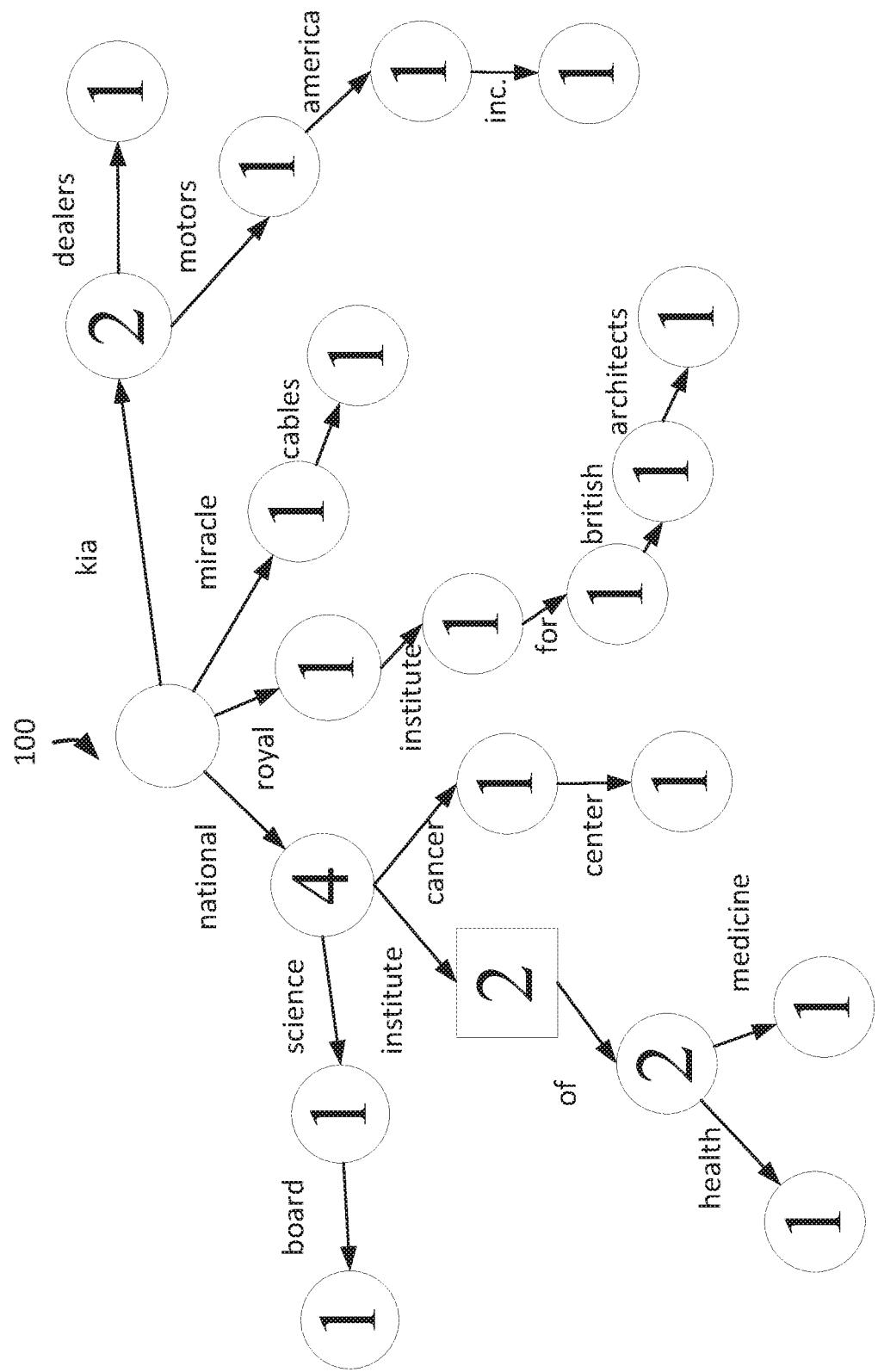
FIGS. 1 A-F illustrate extremely simplified example tries and/or trie branches used for trie-based normalization of field values for matching, in an embodiment.

FIG. 1A depicts a simplified example of an organization name trie 100 that the database system creates based on the following example organization name field values tokenized at the word level. The organization name National Institute of Health is tokenized as <national, institute, of health>, the organization name National Institute of Science is tokenized as <national, institute, of science>, the organization name National Cancer Center is tokenized as <national, cancer, center>, the organization name National Science Board is tokenized as <national, science, board>, the organization name National Institute of Medicine is tokenized as <national, institute, of medicine>, the organization name Royal Institute for British Architects is tokenized as <royal; institute, for, british, architects>, the organization name Miracle Cables is tokenized as <miracle, cables>, the organization name Kia Motors America Inc. is tokenized as <kia, motors, America, inc.> and the organization name Kia Dealers is tokenized as <kia, dealers>. Each word is split on a token separator character, such as a space or an ampersand (&) symbol.

For examples of the token count, the node that follows the branch labelled as national stores the count 4 for the 4 organization names that include national, the next sequential nodes store the count 2 for the 2 corresponding organization names that include institute, or the store the count 1 for the 1 corresponding organization name that includes cancer or science, the following sequential nodes store the count 2 for the 2 corresponding organization names that include of, or store the count 1 for the 1 corresponding organization name that includes center or board, and the last sequential node stores the count 1 for the 1 organization name that includes health or medicine.

Once a database system has trained a trie, the field value normalization problem may be expressed as follows: For a given input field value and a threshold in the range (0, 1), identify the maximal extension of the input field value, such that the count of the node for the maximal extension/the count of the node for the input field value>=the threshold.

The database system traverses the trie starting from the node for the first input field value, as the root, in a depth first search fashion. At each child node, the database system computes the ratio of the count of that child node and the count of the node for the input field value. If the ratio is greater than the threshold, the database system traverses the child nodes of the current child node. If the ratio is not greater than the threshold, the database system stops traversing for child nodes. If after traversing to a current node, none of the child nodes yield a maximal extension, but the computed ratio is greater than the threshold for the current node, then the database system adds that current node to the maximal extensions list. The traversal for a given input field value stops once the computed ratio drops below the threshold.

This prefix trie solution differs from existing auto-complete features because auto-complete features are for searching whereas this prefix trie solution is for matching. Searching occurs when a user explicitly types in whatever the user wants to look for, and then the user selects from a list of options displayed by an auto-complete feature. Thus, even if the desired result is not the first result returned by an auto-complete feature, the user can still select the desired result from the list of results displayed by the auto-complete feature. However, this user option does not occur with matching, which is usually a background process that enriches a database with detailed information, although the matching process could be configured to provide a user with an option to approve the matching of two candidate records. If the desired result is not the first matching result, an incorrect match may result in incorrect data enrichment, thereby leading to an end user's annoyance. Therefore, the threshold may be tuned in order to guarantee a high precision. Another difference between matching and auto-complete searching is that when an input field value is matched for an expansion, the input field value might be expanded partially depending on the threshold. For example, the input field value "Kia" might be expanded to "Kia Motors" instead of expanded to "Kia Motors America Inc." if the ratio for expanding to "Kia Motors America Inc." falls below the threshold. However, auto complete features expand input field values to all possible expansions, and do not limit expansions based on any thresholds.

The trie-based normalizer can output a confidence score along with an extension. A confidence score may be computed as the ratio of the count of the node denoting an extension divided by the count of the node for an input field value. Reflecting the probability of uniqueness of an extension for a given input field value, a confidence score may be passed onto the matching algorithm—which can take the confidence score into account when identifying a match across many fields. A confidence score enables the use of a lower threshold for an extension than the threshold that would be used without a confidence score. A matching rule can determine whether a confidence score is sufficiently high in a given context. For example, a threshold for a confidence score may be higher for a name-address_line-phone match than for a name-city match, thereby resulting in more accurate matching. Since a match rule has more information available than the information available to field normalization, a match rule can make more effective use of a confidence score. Field normalization only identifies an input value of a specific field, whereas a match rule evaluates all the values of the fields of the records being matched. A match rule expands the options for how to use a confidence score because a match rule is not limited to thresholding on a confidence score value. Therefore, a confidence score value can directly influence an overall match score.

The following describes a simplified example of a data set that the database system uses to create a trie, or a branch of a trie, because such a data set in a production environment may include thousands of rows and hundreds of columns, which would be far too complex for depiction in the table below.

| Input Field Value | Count |
|---|---|
| Kia | 1 |
| Kia Motors | 4 |
| Kia Motors America | 3 |
| Kia Motors America Inc. | 11 |
| Kia Dealers | 2 |

Figure 1B:
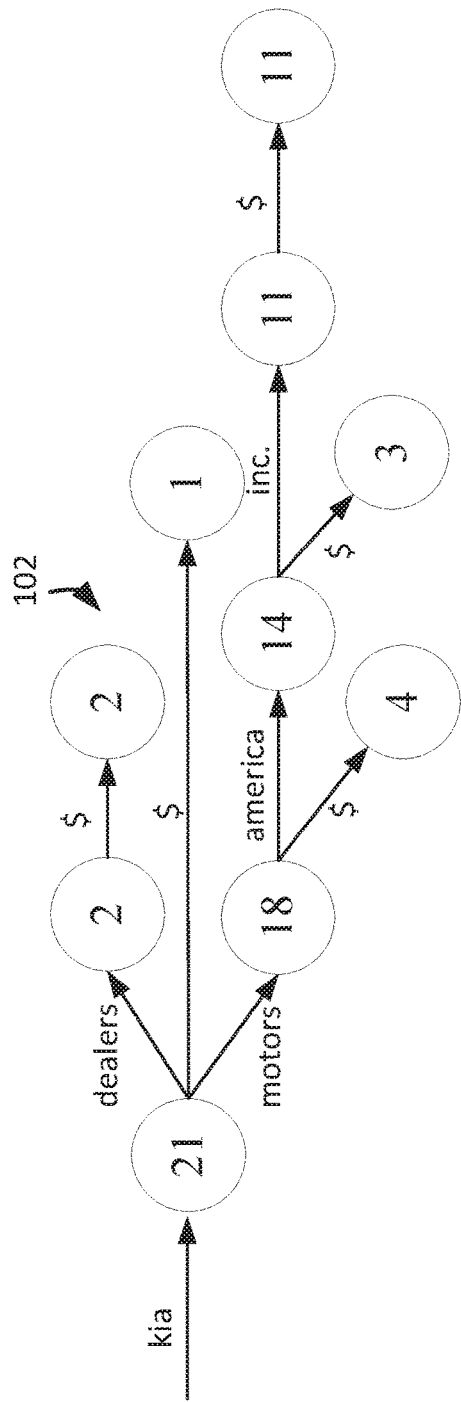

In the table, the input string indicates the company name and the count indicates the number of records in data set that contain that exact input field value. FIG. 1B depicts a trie that is based on the data set in the table above, and may be a branch of the FIG. 1A trie that has been updated with additional records. In FIG. 1B, "$" indicates the end marker for each input string. If the input field value is "Kia Motors" and the threshold is set to 0.52, the database system traverses the FIG. 1B trie, reaches the node for "kia motors America Inc. $", identifies the count of the node for the potential expansion "Kia Motors America Inc $" is 11, identifies the count of the node for the input field value "Kia Motors" is 18, and computes the ratio of the potential expansion count/input field value count as $11/18$, which equals 0.61. Since the database system determines that the computed ratio of 0.61 is greater than the threshold of 0.52, the database system expands the input field value "Kia Motors" to "kia motors America inc. $," and subsequently removes the end marker "$." Then the database system uses the expanded value "Kia Motors America Inc." to correctly match the input record to an existing database record, and enrich the database's information about the company Kia Motors America Inc. The database system is able to identify these records as matching, even though their company names did not match exactly.

Systems and methods are provided for trie-based normalization of field values for matching. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and systems for trie-based normalization of field values for matching will be described with reference to example embodiments. The following detailed description will first describe a method for trie-based normalization of field values for matching.

In accordance with embodiments described herein, there are provided methods and systems for trie-based normalization of field values for matching. A database system tokenizes values stored in a field by multiple records. The database system creates a trie from the tokenized values, each branch in the trie labeled with one of the tokenized values, each node storing a count indicating a number of the multiple records associated with a tokenized value sequence beginning from a root of the trie. The database system tokenizes a value stored in the field by a prospective record. Beginning from the root of the trie, the system identifies each node corresponding to a token value sequence for the prospective record's tokenized value. Beginning from the most recently identified node for the prospective record's token value sequence, the system identifies each extending node which stores a count that satisfies a threshold, each identified extending node corresponding to another token value sequence. The system uses the other token value sequence to identify one of the multiple records that matches the prospective record.

For example, a database system tokenizes Kia as <kia>, Kia Dealers as <kia, dealers>, Kia Motors as <kia, motors>, Kia Motors America as <kia, motors, America>, and Kia Motors America Inc. as <kia, motors, America, inc.> for database records during a trie creating phase. The database system creates a trie that includes a branch labelled kia from the trie root to a first sequential node; branches labelled motors and dealers from the first sequential node to the second sequential nodes; a branch labelled America from one of the second sequential nodes to a third sequential node, and a branch labelled inc. from the third sequential node to a fourth sequential node. The first sequential node stores the count 21 for the 21 organization names that include kia, the second sequential nodes store the count 2 for the 2 corresponding organization names that includes dealers, and store the count 18 for the 18 corresponding organization names that includes motors, the third sequential node stores the count 14 for the 14 corresponding organization name that includes America, and the fourth sequential node stores the count 11 for the 11 organization name that includes inc.

The database system tokenizes a prospective record's company name Kia Motors as <kia, motors>. The database system uses the prospective record's tokenized values to identify that a first sequential node stores the count 21 for the token value sequence kia, and stop after identifying that a second sequential node stores the count 18 for the token value sequence kia, motors, because this token value sequence is the prospective record's company name. The database system traverses the trie from the node for "kia motors," reaches the node for "kia motors America inc.," identifies the count of the node for the potential expansion "Kia Motors America Inc." is 11, identifies the count of the node for the prospective record's company name value "Kia Motors" is 18, and computes the ratio of the potential expansion count/prospective record count as $11/18$, which equals 0.61. Since the database system determines that the computed ratio of 0.61 is greater than the threshold of 0.52, the database system expands the prospective record's company name "Kia Motors" to "kia motors America inc." The database system uses the expanded value "Kia Motors America Inc." to correctly match the input record to an existing database record, and enrich the database's information about the company Kia Motors America Inc.

While one or more implementations and techniques are described with reference to an embodiment in which trie-based normalization of field values for matching is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Other than expansions, the database system can use a prefix trie for substitutions, insertions, and deletions as well. For the following examples, a database system has trained a prefix trie on tokenized words in company names. The following scenarios are less common than those in which company name words are missing from the right tail, however such scenarios do occur. Since the trie is already engineered—with a little enhancement to the lookup time code—the database system can process the following scenarios as well, with no retraining needed.

Figure 1C:
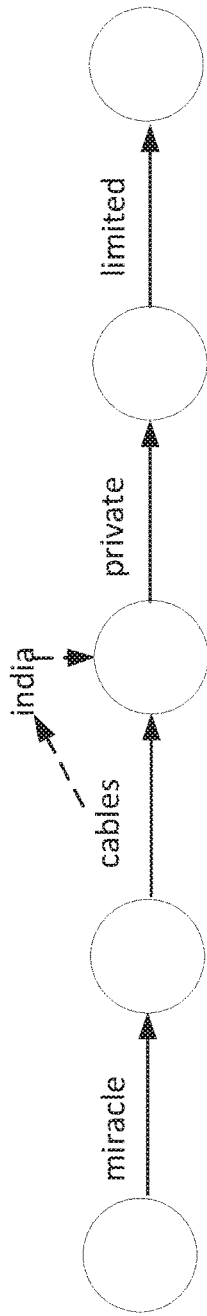

Examples of insert cases include the input string is "Miracle Cables India Private Limited" and the prefix trie has the branch "Miracle Cables Private Limited," the input string is "East Bakersfield High School" and the prefix trie has the branch "Bakersfield High School," and the input string is "Cowan Avenue Magnet Elementary School" and the prefix trie has the branch "Cowan Avenue Elementary School." Each of these normalizations may be referred to as an insert because relative to the reference, the input string has one additional token. To invert this process, the database system can execute an inference-time delete, as depicted in FIG. 1C. The database system receives the input string "Miracle Cables India Private Limited," and the inference logic determines that the input tokens "Miracle Cables" match the node [miracle, cables] in the FIG. 1C trie. Since there is no arc from this node to a node for the next token India, the inference logic bypasses the input token India, as if the input string was "Miracle Cables Private Limited." Consequently, the inference logic matches this bypassed token version of the input string to the full node sequence. FIG. 1C depicts the path through the trie branch [miracle cables private limited], with dashed links showing the inserted India token from the input string. If the database system is applying this inference for normalization, then the probability P(t3=private, t4=limited|t1=miracle, t2=cables) is easily computable from the trie at inference time, as is the confidence with which the database system has bypassed the input string's token India.

Right-tail inserts is a common subcase of the inserts case. An example of a right-tail insert sub-case includes the input string is "Intel Santa Clara" and the prefix trie has the branch "Intel Corporation." The database system can accommodate right-tail inserts by slightly generalizing the inference logic of the parent inserts section. In the generalized inference logic, the input token "Intel" matches the trie's node [intel]. Since this node has no outgoing arc labeled [santa], the database system bypasses the input token "santa." Since this node also has no outgoing arc labeled [clara], the database system also bypasses the input token "clara." Now the inference logic is left with the input token "intel," which matches the trie's node [intel]→corporation with a probability of 0.99. Therefore, the database system accepts this completion, having accomplished the following normalization: Intel Santa Clara→Intel Corporation.

Figure 1D:
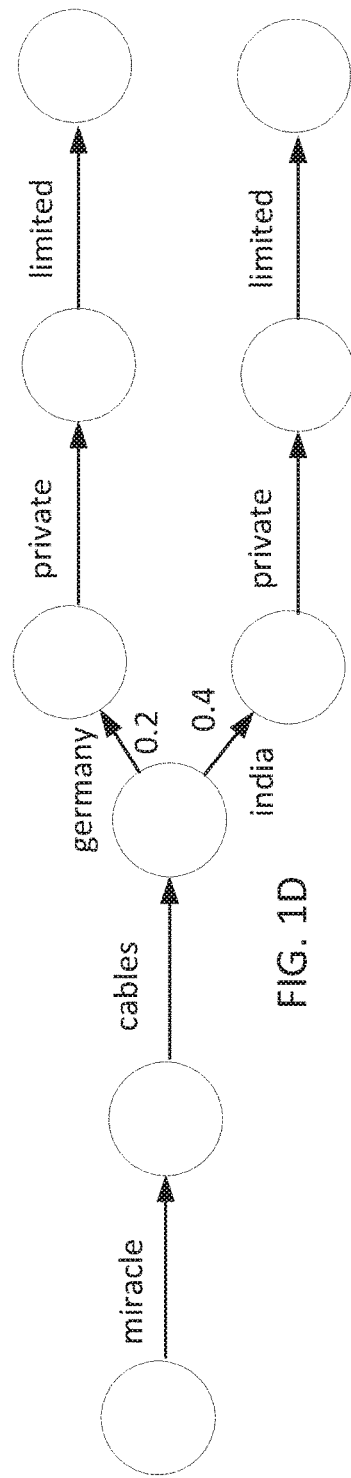

Examples of delete cases include the input string is "Miracle Cables Private Limited" and the prefix trie has the branch "Miracle Cables India Private Limited," the input string is "Bacardi Limited" and the prefix trie has the branch "Bacardi & Company Limited," the input string is "Santa Rosa Charter School" and the prefix trie has the branch "Santa Rosa Accelerated Charter School," and the input string is "Hanford High School" and the prefix trie has the branch "Hanford West High School." In the following example, the input string is "Miracle Cables Private Limited" and the FIG. 1D trie has one branch for [miracle, cables, india, private, limited] and another branch for [miracle, cables, germany, private, limited]. The limited inference logic determines that the input tokens "Miracle Cables" matches the node [miracle, cables] in the trie, and that there is no arc labeled private from this node. If there was an arc labeled private from this node, then the logic would continue until some point which has no extension in the trie, or until the logic reaches the end of the input token sequence. Next, the logic looks ahead to the end-node on each arc emanating from the node [miracle, cables]. From each such end-node, the logic tests if there is an arc labeled private. If the logic identifies such an arc, the logic resumes the lookup from the end-node on this arc for the remaining tokens in the input string. If the logic identifies multiple arcs labeled private, the logic can evaluate remaining lookups starting from each arc. FIG. 1D depicts the trie with dashed arrows representing the logic's looks ahead and the corresponding transition probabilities. These transition probabilities do not sum to 1.0 because the node [miracle, cables] may have additional outgoing arcs. On each completion, the logic attaches a confidence which is the transition probability on the arc involved in that completion divided by the sum of the transposition probabilities on the arc for all successful completions. For example, the FIG. 1D trie infers two completions: Miracle Cables India Private Limited with a confidence of 0.67 [0.4/(0.4+0.2)] and Miracle Cables Germany Private Limited with a confidence of 0.33 [0.2/(0.4+0.2)].

For an example of a substitution case, the input string is "Royal Institute of British Architects" and the prefix trie has the branch "Royal Institute for British Architects." The inference logic identifies the node [royal, institute]. If there is no arc labeled "of" going out of this node, the logic reviews a data set of common substitution and identifies "for" as a common substitution for the token "of." Then the logic determines if there is an arc labeled "for" going out from the node [royal, institute]. If there is such an arc, the logic continues with the lookup, as if the input string had included the token "for" instead of the token "of."

The data set to be matched against can contain millions of field values. Therefore, a database system can use a map-reduce framework to train a trie on such a data set. The following is an example a map reduce algorithm for trie generation for such a large data set.

```
String END_MARKER = "$";
char tokenSeparator = isCharacterTrie ? StringUtils.EMPTY : StringUtils.SPACE;
Map(String normalizedKey) {
    String[ ] tokens =
    normalizedKey.split(tokenSeparator);
    StringBuilder stringBuilder = new
    StringBuilder(normalizedKey.length( ));
    for(int i = 0; i < tokens.length − 1; i++) {
        stringBuilder.append(tokens[i]);
        context.put(stringBuilder.toString( ), tokens[i+1]);
        stringBuilder.append(tokenSeparator);
    }
    stringBuilder.append(tokens[tokens.length − 1])
    context.put(stringBuilder.toString( ), END_MARKER);
}
```

-continued

```
Reduce(String key, List<String> children) {
    int sum = 0;
    Map<String, Integer> childMap = new HashMap<>( );
    for(String child : children){
        sum++;
        if(childMap.containsKey(child)) {
            child.put(child, childMap.get(child) + 1);
        } else {
            childMap.put(child, 1);
        }
    }
    PrefixTrieNode node = new PrefixTrieNode(sum, children);
    context.put(key, gson.to JSON(node));
}
```

The intelligent normalization algorithm trains a trie-based probability model on a data set of tokens and uses the trained trie to intelligently "normalize" input tokens, specifically to fill-in missing suffixes. The algorithm is adaptive as there is a minimum probability threshold beyond which only normalization will take place.

The trie normalization technique may be used as a general method for handling abbreviations by training a character trie for all the words in a given field. The trie expansion technique could be used for abbreviation expansions, therefore eliminating the maintenance of large dictionaries for abbreviation substitutions. A prefix trie can be a tree where all the descendants of a node have a common prefix of the string associated with that node.

Figure 1E:
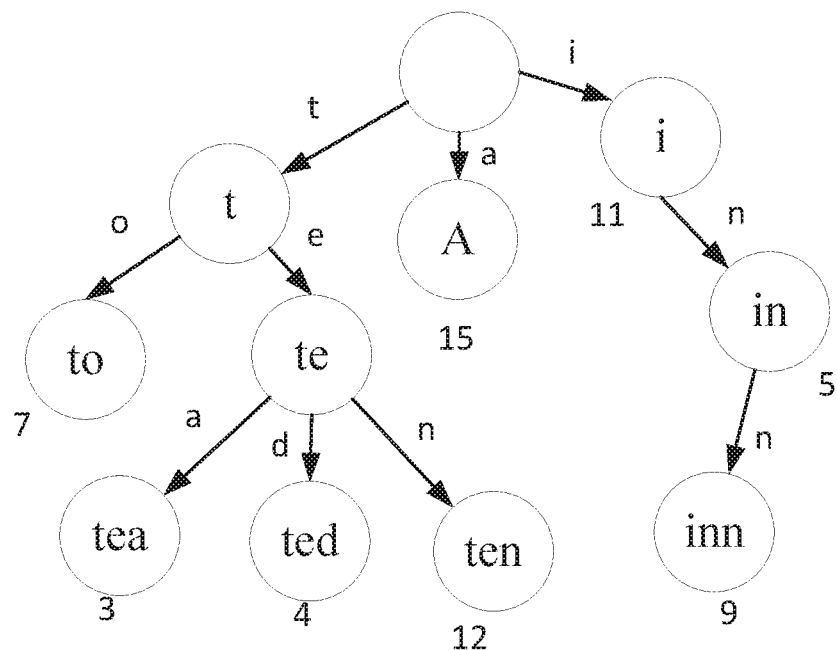

FIG. 1E depicts an example of character prefix tree for the tokens "A," "to," "tea," "ted," "ten," "i," "in," and "inn." Every edge from a parent node to a child node is labeled by a character. Nodes of the trie hold an integer which indicates the count with which that prefix is observed in the database. In contrast to word prefix tries, a character prefix trie may be used for the expansion of abbreviations. Examples of expanding prefix abbreviations in company name words include expanding the input token "assoc" to the word "associates" or the word "association," expanding the input token "tech" to the word "technology" or the word "technologies," expanding the input token "corp" to the word "corporation," and expanding the input token "net" to the word "network."

Since a trie could contain millions of nodes, space efficiency is also important to store such a trie. The following explores different techniques to store such a trie for different space and time complexities. Since a trie may be trained on data from different datasets, the trie may be significantly large in terms of memory. Therefore, different implementation approaches may be prototyped and profiled for memory usage and speed. A trie implementation is a basic tree implementation where a tree is represented by a node containing the count of the prefix and references to the child nodes:

```
class TrieNode
{
    private int count;
    private HashMap<String, TrieNode> children; // key -> label, value -> child
}
class PrefixTrie
{
    private TrieNode root = new TrieNode( );
}
```

The advantage of this trie implementation is that it is an intuitive way to implement a tree. However, this trie implementation may not be very cache friendly, and there may be many null references which occupy memory. All of the tokens in an input string have to be iterated over to locate the corresponding node in the trie, thereby resulting in an O(n) lookup where n is the length of the string.

If a hash map is created that maps the prefix (key) to the trie node (value), then every node in a prefix tree has a O(1) access. The hash map data structure may be:

```
class TrieNode
{
    private int count;
    private HashMap<String, TrieNode> children; // key -> label, value -> child
}
class PrefixTrie
{
    private HashMap<String, TrieNode> nodeMap = new HashMap<String, TrieNode>( );
}
```

The advantage of the hash map approach is that it provides very fast access to the trie nodes, but this fast access is at the cost of memory. Since each prefix string is hashed, the memory required is significantly more than the memory required for the trie-based approach.

Figure 1F:
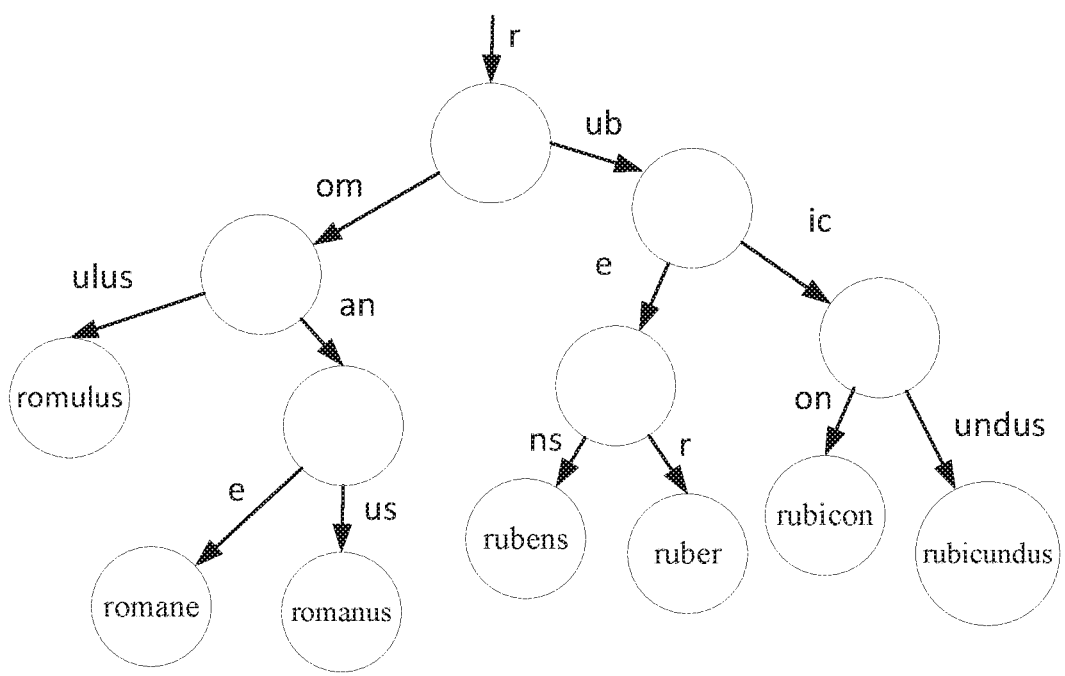

FIG. 1F depicts a radix trie, which is a space-optimized trie in which each node that is the only a child node is merged with its parent node. This merging leads to fewer node allocations, and therefore requires less memory consumption. Out of all approaches the radix trie is the most space optimal technique. However, the logic of searching and other trie operations becomes more complicated, thereby resulting in greater time required for trie operations.

```
class RadixTrieNode
{
    private int count;
    private HashMap<String, String> labels; // starting token of label-> child prefix;
    private HashMap<String, RadixTrieNode> children; // child prefix -> node reference
}
class RadixTrie
{
    private RadixTrieNode root = new RadixTrieNode( );
}
```

Given that a database system may be training on data from all vendors, and the database system's processing node capacity may be limited, maintaining a significantly large in-heap data structure may not be possible or economically feasible. Therefore, an off-heap implementation of trie may be an alternative. Off-heap implementations store data in byte buffers outside the heap, and are protected from garbage collection. MapDB and Chronicle Map are two implementations of off-heap key value stores.

MapDB provides creation of hash maps and multimaps using direct byte buffers. The data structure uses a map to associates a prefix with the count and a multimap that represents edges. However, a hash map for every node to represent edges may be too slow when using MapDB.

```
class Trie
{
    private Map nodes;
    private NavigableSet<Object[ ]> edges;
}
```

Chronicle Map is a high performance, off-heap, key-value, in-memory, persisted data store, that uses shared segmented memory which may be accessed by multiple virtual machines.

```
class Trie
{
    private ChronicleMap<String, Integer> nodes = ChronicleMap
        of (String.class, Integer.class)
        .averageKey("British Petroleum")
        .entries(9196022)
        .create( );
    private ChronicleMap<String, StringBuilder> edges = ChronicleMap .
        of (String.class, StringBuilder.class)
        .averageKey("British Petroleum")
        .entries(9196022)
        .averageValue(newStringBuilder("a s d f g'"'))
        .create( );
}
```

Creating collections of collections as values is complex using Chronicle Map. Hence all the children labels from a node are appended in one StringBuilder, separated by space, and then stored in map. Chronicle Map is more efficient when compared to MapDB, but it is more complex implementation-wise.

When compared to other data structures, an advantage of using an array to implement a trie is that an array is more cache-friendly and more compact. However, the main drawback of representing a trie as an array is child lookup complexity. In order to find a node labeled by a string from a node, a binary search or a complex hash function is required for finding the right child node.

If an entire trie is stored in a database like CouchDB, there will be just one copy of such a trie, which may be accessed by all processing nodes, therefore saving memory on the processing nodes. Changing to a database will not incur many changes as the inference algorithms implemented on the trie are coded to an interface rather than the concrete implementation.

The trie-based normalization of field values is generic enough to be used with fields other than company name, such as fields for city and country. For example, the input string "lake tahoe" may be normalized to "south lake tahoe." This normalization may be accomplished by training a forward trie for completing the suffix and a backward trie for completing the prefix. For example, the input string "santa fe" is normalized to "santa fe springs" with a confidence of 0.37039911308203993.

The technique is flexible enough to control the granularity of expansion. The threshold for expansion may be fine-tuned to achieve a desired level of expansion. A strict threshold ensures a very high likely expansion, while a low threshold can result in multiple expansions. During training of the trie, bias towards company names may be introduced to favor their expansions, which is important for companies in fortune 1000 list, because missing such a match may result in end user frustration. This bias introduction may be accomplished through increasing the frequency of all fortune 1000 companies by a certain amount that ensures that words starting with any such company most likely expands to that company.

Figure 2:
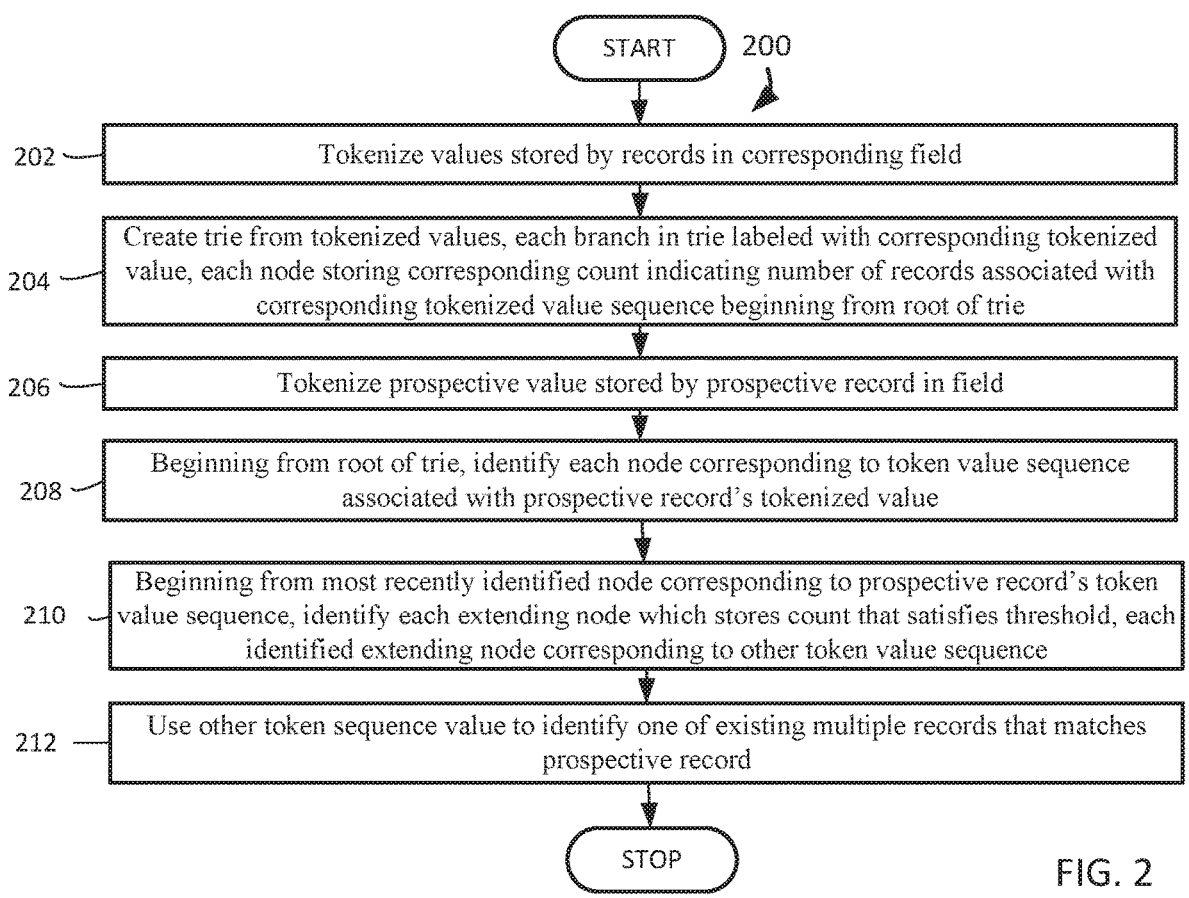
FIG. 2 is an operational flow diagram illustrating a high-level overview of a method for trie-based normalization of field values for matching, in an embodiment.

FIG. 2 is an operational flow diagram illustrating a high-level overview of a method 200 for trie-based normalization of field values for matching. Values stored in a corresponding field by records are tokenized, block 202. The database system tokenizes record field values to create a trie that will be used to match field values. For example, and without limitation, this can include the database system tokenizing Kia as <kia>, Kia Dealers as <kia, dealers>, Kia Motors as <kia, motors>, Kia Motors America as <kia, motors, America>, and Kia Motors America Inc. as <kia, motors, America, inc.> for database records during a trie creating phase. In an alternative example, the database system tokenizes city names for database records, including Daytona Beach as <daytona, beach>. A value can be the symbols on which operations are performed by a computer, being stored and transmitted in the form of electrical signals and recorded on magnetic, optical, or mechanical recording media. A record can be the storage of at least one value in a persistent form. A field can be a part of a record, representing an item of data. Tokenizing can be the process of dividing a stream of text up into words, phrases, symbols, or other meaningful elements, which may be referred to as tokens.

Having tokenized the database records' values, a trie is built from the tokenized values, each branch in the trie labeled with a corresponding tokenized value, each node storing a corresponding count indicating a number of the records associated with a corresponding tokenized value sequence beginning from a root of the trie, block 204. The database system creates a trie to match field values. By way of example and without limitation, this can include the database system creating a trie that includes a branch labelled kia from the trie root to a first sequential node; branches labelled motors and dealers from the first sequential node to the second sequential nodes; a branch labelled America from one of the second sequential nodes to a third sequential node, and a branch labelled inc. from the third sequential node to a fourth sequential node, as depicted in FIG. 1A. The first sequential node stores the count 21 for the 21 organization names that include kia, the second sequential nodes store the count 2 for the 2 corresponding organization names that include dealers, and store the count 18 for the 18 corresponding organization names that include motors, the third sequential node stores the count 14 for the 14 corresponding organization names that include America, and the fourth sequential node stores the count 11 for the 11 organization names that includes inc., as depicted in FIG. 1B.

In an alternative example, the database system creates a trie from the tokenized values of the city name values stored in the database records' city name fields. A trie can be a tree-like ordered data structure that is used to store a dynamic set or associative array of values. A branch can be a subdivision or a lateral extension extending from the main part of a tree or a trie. A node can be a connecting point at which lines or pathways in a tree or trie intersect or branch. A root can be the originating point of a tree or trie. A number and/or a count can be an arithmetical value, expressed by a word, symbol, or figure, representing a particular quantity and used in making calculations and for showing order in a series or for identification. A tokenized value can be a symbol or text divided into words, phrases, symbols, or other meaningful elements. A tokenized value sequence, or a token value sequence, can be a particular order in which divided words, phrases, symbols, or elements follow each other.

After the trie is built, a prospective value stored in the field by a prospective record is tokenized, block 206. The database system tokenizes a prospective record's value to match the prospective record to existing database records. In embodiments, this can include the database system tokenizing a prospective record's company name Kia Motors as <kia, motors>. In an alternative example, the database system tokenizes the prospective record's city name Daytona as <daytona>. A prospective record can be at least one stored value that could potentially be stored in a database. A prospective value can be a symbol that could potentially be stored in a database of records.

Once the prospective record's field value is tokenized, beginning from the root of the trie, each node is identified corresponding to a token value sequence associated with the prospective record's tokenized value, block 208. The database system identifies specific nodes that represent the prospective record's values. For example, and without limitation, this can include the database system using the prospective record's tokenized value to identify that a first sequential node stores the count 21 for the token value sequence kia, and stops after identifying that a second sequential node stores the count 18 for the token value sequence kia, motors, because this token value sequence is the prospective record's company name. In an alternative example, the database system stops after identifying that a first sequential node stores a count for the token value sequence daytona.

Identifying each node corresponding to a token value sequence associated with a tokenized value may include bypassing a token value in the token value sequence associated with a prospective record. For example, the database system receives the prospective record's company name "Miracle Cables India Private Limited," determines that the input tokens "Miracle Cables" match the node [miracle, cables] in the FIG. 1C trie, determines that there is no arc from this node to any node for the next token India, and bypasses the input token India, such that the bypassed token version "Miracle Cables Private Limited" matches the full node sequence [miracle, cables, private, india].

Identifying each node corresponding to a token value sequence associated with a tokenized value may include bypassing a node that lacks a correspondence to a token value in the token value sequence associated with the prospective record. For example, the database system receives a prospective record that has the company name "Miracle Cables Private Limited" and determines that the FIG. 1D trie has one branch for [miracle, cables, india, private, limited] and another branch for [miracle, cables, germany, private, limited]. Since the input tokens "Miracle Cables" match the node [miracle, cables] in the trie, and there is no arc labeled private from this node, the database system looks ahead to the end-node on each arc emanating from the node [miracle, cables]. From each such node, the database system tests if there is an arc labeled private, and then resumes the lookup from the endpoint on this arc for the remaining tokens in the input string. If a value tokenized from a prospective record does not correspond to the next node in a trie, the database system can test for both the insert case and the delete case.

Bypassing a node may include identifying a subsequent node based on a transition probability associated with the subsequent node. For example, since multiple arcs from the [miracle, cables] node are labeled private, the database system evaluates remaining lookups starting from each arc, based on each arc's corresponding transition probabilities. On each completion, the database system attaches a confidence which is the transition probability on the arc involved in that completion divided by the sum of the transposition probabilities on the arcs for all successful completions. For example, the FIG. 1D trie infers two completions: Miracle Cables India Private Limited with a confidence of 0.67 [0.4/(0.4+0.2)] and Miracle Cables Germany Private Limited with a confidence of 0.33 [0.2/(0.4+0.2)]. A transition probability can be the extent to which a traversal from one node to another node is likely to occur, measured by the ratio of the favorable cases to the whole number of cases possible.

Identifying each node corresponding to a token value sequence associated with a tokenized value may include replacing a token value in the token value sequence with a substitute token value. For example, the database system receives a prospective record that has a company name "Royal Institute of British Architects" and the FIG. 1A prefix trie has a "Royal Institute for British Architects" branch. Since there is no arc labeled "of" going out of the [royal, institute] node, the database system reviews a data set of common substitution, identifies "for" as a common substitution for the token "of," determines that there is an arc labeled "for" going out from the node [royal, institute], and continues with the lookup, as if the prospective record's company name had included the token "for" instead of the token "of." A substitute token value can be replacement symbols or text divided into words, phrases, symbols, or other meaningful elements.

Following the tokenizing of the prospective record's value, beginning from the most recently identified node for the prospective record's token value sequence, each extending node is identified which stores a count that satisfies a threshold, each identified extending node corresponding to another token value sequence, block 210. The database system identifies nodes for a normalization of the prospective record's value. By way of example and without limitation, this can include the database system traversing the trie from the node for "kia motors," reaching the node for "kia motors America," identifying the count of the node for the potential expansion "Kia Motors America" is 14, identifying the count of the node for the prospective record's company name value "Kia Motors" is 18, and computing the ratio of the potential expansion count/prospective record count as 14/18, which equals 0.61. Since the database system determines that the computed ratio of 0.77 is greater than the threshold of 0.52, the database system continues traversing the trie. If the computed ratio was less than the threshold, the database system would not identify the token value sequence "Kia Motors America" as a potential expansion for the prospective record's company name Kia Motors, and would stop traversing the trie.

Continuing the example, database system continues traversing the trie from the node for "kia motors America," reaching the node for "kia motors America inc.," identifying the count of the node for the potential expansion "Kia Motors America Inc" is 11, identifying the count of the node for the prospective record's company name value "Kia Motors" is 18, and computing the ratio of the potential expansion count/prospective record count as 11/18, which equals 0.61. Since the database system determines that the computed ratio of 0.61 is greater than the threshold of 0.52, the database system expands the prospective record's company name "Kia Motors" to "kia motors America inc." If the computed ratio was less than the threshold, the database system would not identify the token value sequence "Kia Motors America Inc." as a potential expansion for the prospective record's company name Kia Motors, would identify the token value sequence "Kia Motors America" as the potential expansion for the prospective record's company name Kia Motors, and would stop traversing the trie. An extending node can be a connecting point at which lines or pathways in a tree or trie are made longer. A most recently identified node can be a connecting point at which lines or pathways in a tree or trie intersect or branch, the connecting point having been selected at a time that is relatively close to the present. A threshold can be the magnitude or intensity that must be met or exceeded for a certain reaction, phenomenon, result, or condition to occur or be manifested.

After the other token value sequence is identified for the prospective record, the other token value sequence is used to identify one of the existing multiple records which matches the prospective record, block 212. The database system uses normalizations of field values to match records. For example, and without limitation, this can include the database system using the expanded value "Kia Motors America Inc." to correctly match the prospective record for Kia Motors to an existing database record for Kia Motors America Inc., and enrich the database's information about the company Kia Motors America Inc. The database system is able to identify these records as matching, even though their company names did not match exactly. Identifying the existing record that matches the prospective record may include submitting the match identification for approval by a user. For example, the database system submits the match between the prospective record's city name of Santa Fe and the existing database record for Santa Fe Springs to a database system user to approve the match, because the confidence of 0.37 for this match is less than the confidence threshold of 0.50 for automatically processing a match without user approval. An existing record can be at least one value that is already stored in the database. Matching records can be stored values that correspond to each other in some essential respect.

The method 200 may be repeated as desired. Although this disclosure describes the blocks 202-212 executing in a particular order, the blocks 202-212 may be executed in a different order. In other implementations, each of the blocks 202-212 may also be executed in combination with other blocks and/or some blocks may be divided into a different set of blocks.

System Overview

Figure 3:
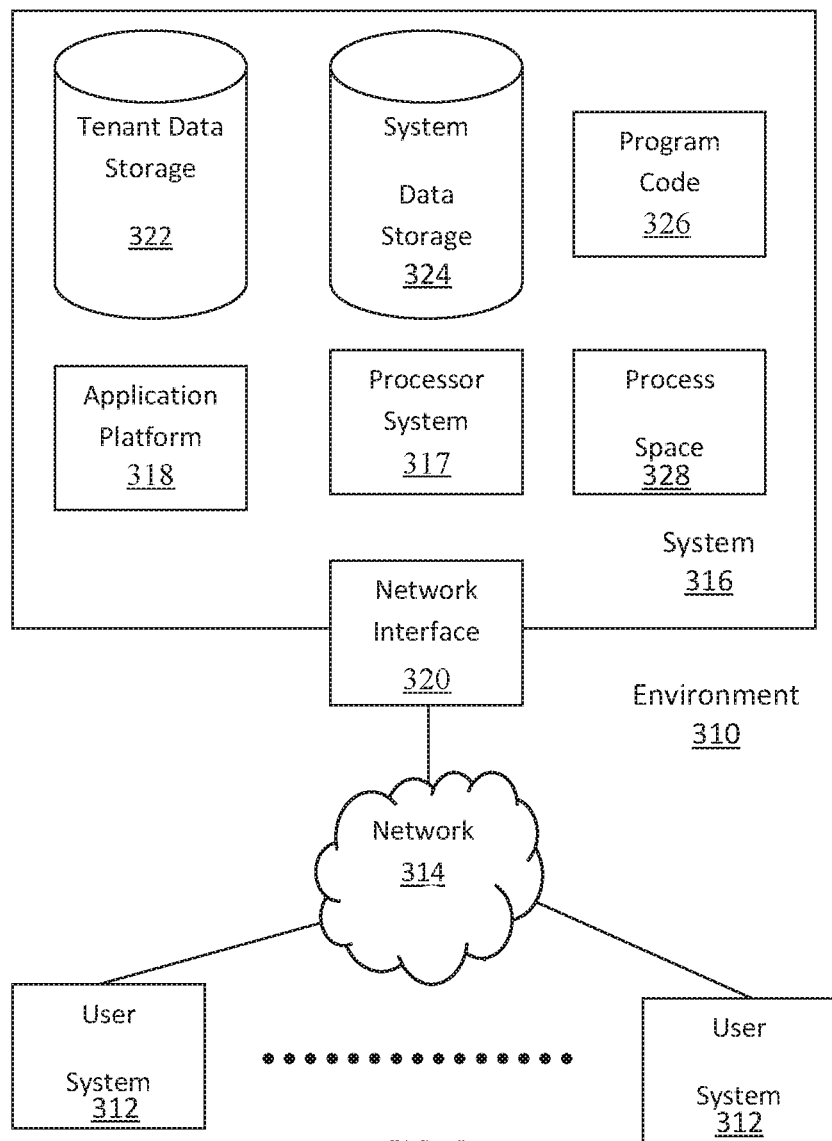
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/ in which may be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 4:
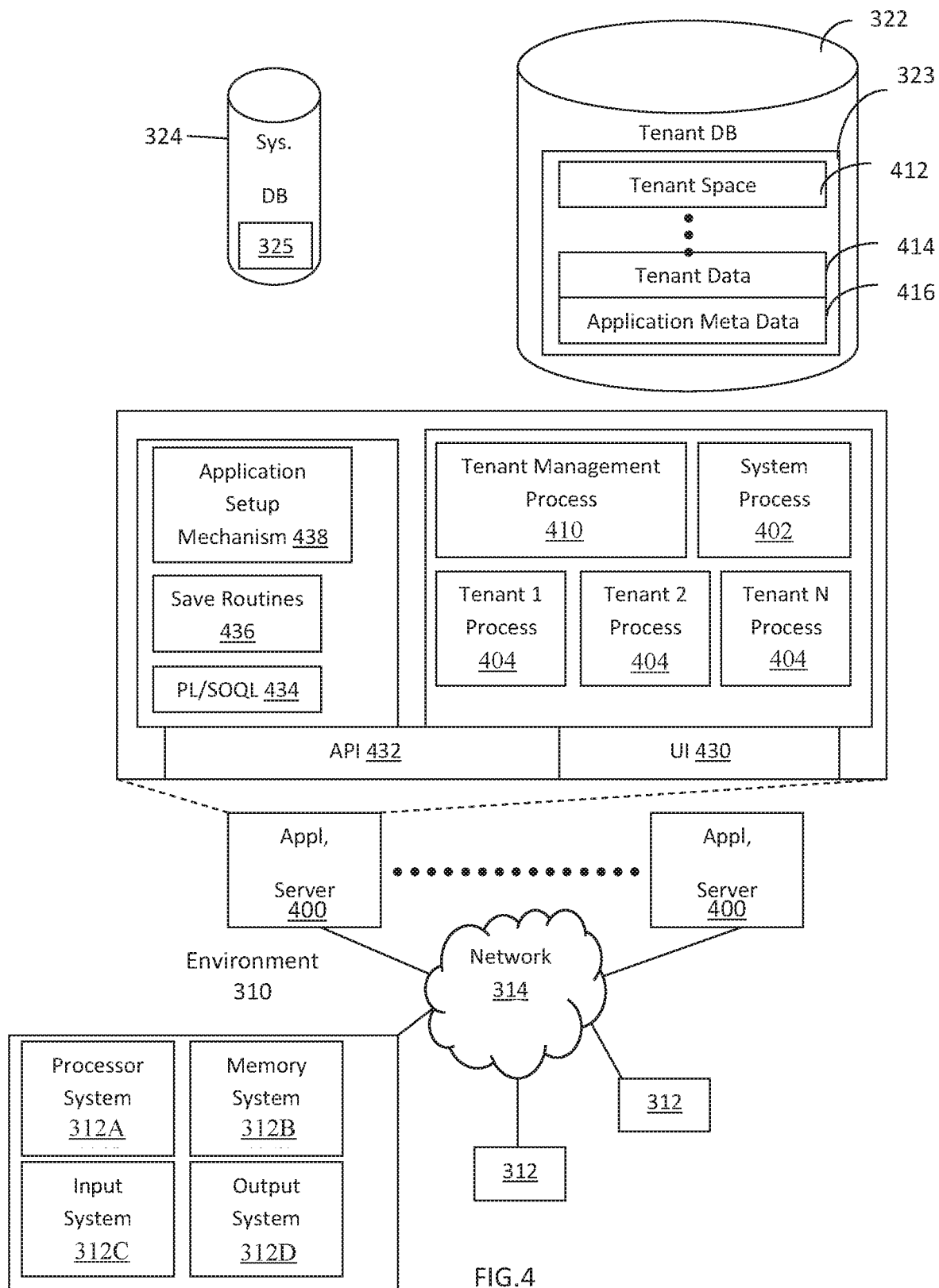
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 4001-400N, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which may be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 4001 might be coupled via the network 314 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also may be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
one or more processors; and
a non-transitory computer readable medium storing a plurality of instructions, which when executed, cause the one or more processors to:
tokenize, by a database system, values stored in a field, of a plurality of fields, by a plurality of records;
create, by the database system, a trie from the tokenized values, each branch in the trie for the field being labeled with one of the tokenized values, each node of the trie for the field storing a count indicating a number of the plurality of records associated with a tokenized value sequence beginning from a root of the trie;
tokenize, by the database system, a record field value stored in the field by a prospective record;
identify, by the database system, beginning from the root of the trie, each node corresponding to a token value sequence associated with the tokenized record field value;
identify, by the database system, beginning from a most recently identified node corresponding to the token value sequence, each extending node storing a record number count that when divided by another count, corresponding to the most recently identified node, generates a corresponding ratio which is determined to satisfy a threshold, each identified extending node corresponding to an extending token value sequence associated with the field; and
identify, by the database system, using the extending token value sequence associated with the field, an existing record of the plurality of records that matches the prospective record.

2. The system of claim 1, wherein identifying each node corresponding to the token value sequence associated with the tokenized record field value comprises bypassing a token value in the token value sequence associated with the prospective record.

3. The system of claim 1, wherein identifying each node corresponding to the token value sequence associated with the tokenized record field value comprises bypassing a node that lacks a correspondence to a token value in the token value sequence associated with the prospective record.

4. The system of claim 3, wherein bypassing the node comprises identifying a subsequent node based on a transition probability associated with the subsequent node.

5. The system of claim 1, wherein identifying each node corresponding to the token value sequence associated with the tokenized record field value comprises replacing a token value in the token value sequence with a substitute token value.

6. The system of claim 1, wherein identifying the existing record that matches the prospective record comprises submitting the match identification for approval by a user.

7. A computer program product comprising a non-transitory computer readable medium with computer readable program code stored thereon, to be executed by one or more processors when retrieved from the non-transitory computer-readable medium, the program code including instructions to:
tokenize, by a database system, values stored in a field, of a plurality of fields, by a
plurality of records;
create, by the database system, a trie from the tokenized values, each branch in the trie for the field being labeled with one of the tokenized values, each node of the trie for the field storing a count indicating a number of the plurality of records associated with a tokenized value sequence beginning from a root of the trie;
tokenize, by the database system, a record field value stored in the field by a prospective record;
identify, by the database system, beginning from the root of the trie, each node corresponding to a token value sequence associated with the tokenized value;
identify, by the database system, beginning from a most recently identified node corresponding to the token value sequence, each extending node storing a record number count that when divided by another count, corresponding to the most recently identified node, generates a corresponding ratio which is determined to satisfy a threshold, each identified extending node corresponding to an extending token value sequence associated with the field; and
identify, by the database system, using the extending token value sequence, an existing record of the plurality of records that matches the prospective record associated with the field.

8. The computer program product of claim 7, wherein identifying each node corresponding to the token value sequence associated with the tokenized record field value comprises bypassing a token value in the token value sequence associated with the prospective record.

9. The computer program product of claim 7, wherein identifying each node corresponding to the token value sequence associated with the tokenized record field value comprises bypassing a node that lacks a correspondence to a token value in the token value sequence associated with the prospective record.

10. The computer program product of claim 9, wherein bypassing the node comprises identifying a subsequent node based on a transition probability associated with the subsequent node.

11. The computer program product of claim 7, wherein identifying each node corresponding to the token value sequence associated with the tokenized record field value comprises replacing a token value in the token value sequence with a substitute token value.

12. The computer program product of claim 7, wherein identifying the existing record that matches the prospective record comprises submitting the match identification for approval by a user.

13. A method comprising:
tokenizing, by a database system, values stored in a field, of a plurality of fields, by a
plurality of records;
creating, by the database system, a trie from the tokenized values, each branch in the trie for the field being labeled with one of the tokenized values, each node of the trie for the field storing a count indicating a number of the plurality of records associated with a tokenized value sequence beginning from a root of the trie;
tokenizing, by the database system, a record field value stored in the field by a prospective record;
identifying, by the database system, beginning from the root of the trie, each node corresponding to a token value sequence associated with the tokenized record field value;
identifying, by the database system, beginning from a most recently identified node corresponding to the token value sequence, each extending node storing a record number count that when divided by another count, corresponding to the most recently identified node, generates a corresponding ratio which is determined to satisfy a threshold, each identified extending node corresponding to an extending token value sequence associated with the field; and
identifying, by the database system, using the extending token value sequence associated with the field, an existing record of the plurality of records that matches the prospective record.

14. The method of claim 13, wherein identifying each node corresponding to the token value sequence associated with the tokenized record field value comprises bypassing a token value in the token value sequence associated with the prospective record.

15. The method of claim 13, wherein identifying each node corresponding to the token value sequence associated with the tokenized record field value comprises bypassing a node that lacks a correspondence to a token value in the token value sequence associated with the prospective record.

16. The method of claim 15, wherein bypassing the node comprises identifying a subsequent node based on a transition probability associated with the subsequent node.

17. The method of claim 13, wherein identifying each node corresponding to the token value sequence associated with the tokenized record field value comprises replacing a token value in the token value sequence with a substitute token value.

* * * * *